Patented Dec. 15, 1942

2,304,872

UNITED STATES PATENT OFFICE 2,304,872

DECOMPOSITION OF ESTERS

Gustave Bryant Bachman and Howard A. Tanner, Rochester, N. Y., assignors to Eastman Kodak Company, Rochester, N. Y., a corporation of New Jersey No Drawing. Application May 20, 1939,
Serial No. 274,806

8 Claims. (Cl. 260—541)

This invention relates to a catalytic process for the decomposition of esters and more particularly to a vapor phase catalytic process for converting esters into organic acids and olefines.

In certain industrial processes, esters arise as by-products. It is often desirable to have a satisfactory method available for decomposing the ester in order to recover valuable constituents therein, as for example, the acid constituents.

Prior to our invention, one usual method of decomposing esters was by hydrolysis of the ester in aqueous solution. In some instances this hydrolysis was carried out in the presence of inorganic acids or other agents to promote the decomposition. However, even though various expedients were employed such hydrolysis processes required considerable quantities of water and in the case of comparatively low molecular weight esters such as ethyl or isopropyl acetate, so much water is necessary to obtain substantially complete hydrolysis that the recovery of the resultant water-soluble acid and/or alcohol is uneconomical.

We have found a method for the decomposition of esters wherein the acid may be obtained, in a relatively anhydrous condition. Our novel method gives relatively high yields and is efficient and economical.

This invention has for one object to provide a process for decomposing various esters into acids and olefines. Another object is to provide a method which is particularly adapted for the decomposition of esters of low molecular weight into acids and olefines. Still another object is to provide a catalytic process which may be applied to the decomposition of esters either in the anhydrous or partially hydrous condition. Still another object is to provide a catalytic process of decomposing esters which may be carried out at various temperatures above 350° C. A still further object is to provide a new catalyst particularly adapted for use in ester decomposition. Still another object is to provide a new catalyst comprising copper and boric acid constituents. Other objects will appear hereinafter.

We have found that various esters may be decomposed by contacting the ester at an elevated temperature with a suitable catalyst. We have found that a catalyst containing copper and boric acid or boric acid constituents is an unusually efficient catalyst for this decomposition process.

We have found that such a catalyst may be readily prepared, maintains its activity unimpaired through long usage, and leads to the formation of very small amounts of by-products. Its efficiency appears to be in no way affected by the presence in the reactants of, for example, a substantial content of water vapor. This is an advantage in that it is readily apparent that the ester does not need to be dried or otherwise specially processed, prior to recovering the acid and olefine components therefrom.

While we usually employ a catalyst essentially comprising a high-grade copper compound with boric acid, it is to be noted that our catalyst may be compounded in a certain modified manner. For example, in place of copper, copper oxide may be employed as will be apparent hereinafter. Our catalyst may also comprise a copper borate, if desired, in the presence of some free copper and boric acid. When we refer to catalysts comprising copper and boron constituents, we refer to compounds of any of the aforementioned types and intend to cover the elements either in the metallic condition or in the form of compounds thereof, such as the oxides or other derivatives.

A more complete understanding of our invention will be had from a consideration of the following examples which are set forth primarily for the purposes of illustration. Hence, it is to be understood that our invention is not to be unduly restricted thereby.

EXAMPLE I.—*Decomposition of ethyl acetate with boric acid on metallic copper*

In a glass tube suspended in a vertical electric furnace were placed copper turnings thoroughly dusted with boric acid. The catalyst section was one inch in diameter and two feet long. Between the glass tube and the inside wall of the furnace a thermocouple was inserted to determine the temperature. When a temperature of 500° C. was reached 83 grams of ethyl acetate were dropped slowly into the upper end of the tube over a period of about an hour and a half. The liquid products were condensed and the gaseous products absorbed in fuming sulfuric acid (20% oleum) and strong caustic alkali solution. There were obtained: ethyl acetate, 12 grams; acetic acid, 41 grams; ethylene, 16 grams; carbon dioxide, 1 gram. The ester was therefore 85% decomposed. The fraction decomposed gave an 87% yield of acetic acid and a 74% yield of ethylene.

EXAMPLE II.—*Decomposition of iso-propyl acetate with boric acid on metallic copper*

Using the same catalyst and the same apparatus and technique in this example as in the previous one except that 100 grams of iso-propyl acetate and a temperature of 550° C. were employed, the following products were obtained: iso-propyl acetate, 10 grams; acetic acid, 50 grams; propylene, 34 grams. These amounts correspond to 90% decomposition of the ester and yields of 95% for the acetic acid and 92% for the propylene.

EXAMPLE III.—*Decomposition of ethyl acetate with copper borate*

Copper borate was prepared by fusing together stoichiometrical quantities of copper oxide and boric acid. The blue glassy product was broken up and loaded into the catalyst tube to a depth of 10 inches. With the furnace at 520° C. 100 grams of ethyl acetate were introduced into the tube as before. The products contained ethyl acetate, 12 grams; acetic acid, 39.5 grams; ethylene, 2 grams. These amounts correspond to 88% decomposition of the ester with yields of 66% for the acetic acid and 7% for the ethylene.

While the aforementioned examples represent satisfactory procedure, our invention embraces certain modifications. It is to be clearly understood that although our process is particularly satisfactory for the treatment of low molecular weight esters, it may also be applied to the treatment of esters having a higher molecular weight than those specifically shown in the examples. Some additional esters which may be treated are as follows: benzoates, phthalates, succinates, stearates, palmitates, and esters of the alcohols: butyl, iso-butyl, tertiary butyl, secondary butyl, the various amyl alcohols, cyclohexanol and substituted cyclohexanols, phenylethyl alcohol.

The preferred temperature range (under ordinary atmospheric pressure conditions) is between 480–625° C. However, other temperatures may be employed, depending upon the particular ester being treated and other conditions. For example, temperatures between 200° C.–800° C. may be employed in some instances. It is also to be understood that our process may be operated under either positive pressure or reduced pressure, if desired, but in view of the satisfactory results obtained in accordance with examples which we have described, extreme alteration in pressure conditions is unnecessary.

As indicated, our novel catalyst maintains its activities unimpaired for long periods of time. However, if desired, the catalyst may be regenerated, revivified, or otherwise activated or treated by oxidation, steaming, high heating or by other expedients for eliminating undesired depositions or otherwise improving the catalyst. Small amounts of additional constituents which are non-detrimental to our reaction may be incorporated therewith.

It is apparent therefore, that our invention is susceptible of some modification; hence, we do not wish to be restricted excepting insofar as is necessitated by the prior art and the spirit of the appended claims.

What we claim and desire to be secured by Letters Patent of the United States is:

1. A process for treating an organic by-product compound containing at least one ester from the group consisting of ethyl, propyl, butyl and amyl esters, to obtain an acid content from the ester, which comprises heating the compound in the presence of a catalyst essentially of copper and boron at a temperature between 400° C. to 700° C. to obtain decomposition into a reaction mixture containing said acid.

2. A process for the treatment of low molecular weight esters in which one of the ester radicals has at least two carbon atoms, which comprises passing the ester, under substantially anhydrous conditions, in contact with a catalyst essentially of a boric acid derivative of a metal which will cause hydrogenation, at a temperature between 500 to 550° C. to cause at least a part of the ester to decompose into organic acid, and separating the acids so obtained.

3. A process for obtaining substantially anhydrous acetic acid from ethyl acetate, which comprises heating the ethyl acetate in the presence of a copper and boric acid catalyst at a temperature above 450° C., whereby at least a 70% yield of acetic acid is obtained.

4. A process for converting propyl acetate into acetic acid and propylene, which comprises heating said propyl acetate to a temperature in excess of 500° C. in the presence of a catalyst of copper and boron.

5. A process for converting esters in which one of the ester radicals has at least two carbon atoms, to acids and olefines, which comprises contacting said esters with a catalyst essentially comprising a copper borate at a temperature of between 400° C. to 700° C. to cause the decomposition of the ester into organic acid and olefine.

6. A process for treating esters containing at least one ester radical from the group consisting of ethyl, propyl, butyl and amyl esters, to obtain an acid content from the ester, which comprises heating the ester in the presence of a catalyst, essentially copper, at a temperature between 400° C. to 700° C. to obtain decomposition of the ester into a reaction mixture containing said acid.

7. A process for converting esters in which one of the ester radicals has at least two carbon atoms, to acids and olefines, which comprises contacting said esters with a catalyst of copper borate in the presence of some free copper and boric acid, at a temperature between 500° C. to 550° C. to cause the decomposition of the ester into organic acid and olefine.

8. A process for converting esters in which one of the ester radicals has at least two carbon atoms, and in the presence of not more than a few percent of water, to acids and olefines, which comprises contacting said esters with a catalyst essentially comprised of the product resulting from the fusion of a mixture consisting principally of copper oxide and boric acid, to cause the decomposition of at least a part of the ester into acid and olefine.

GUSTAVE BRYANT BACHMAN.
HOWARD A. TANNER.